(12) United States Patent
Sacchetti et al.

(10) Patent No.: US 7,019,097 B2
(45) Date of Patent: Mar. 28, 2006

(54) PROCESS FOR THE (CO)POLYMERIZATION OF ETHYLENE

(75) Inventors: Mario Sacchetti, Ferrara (IT); Diego Brita, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 45 days.

(21) Appl. No.: 10/471,497

(22) PCT Filed: Mar. 11, 2002

(86) PCT No.: PCT/EP02/02803

§ 371 (c)(1),
(2), (4) Date: Sep. 11, 2003

(87) PCT Pub. No.: WO02/074818

PCT Pub. Date: Sep. 26, 2002

(65) Prior Publication Data

US 2004/0116631 A1   Jun. 17, 2004

(30) Foreign Application Priority Data

Mar. 15, 2001   (EP) .................................. 01201043

(51) Int. Cl.
*C08F 110/02* (2006.01)
*C08F 4/42* (2006.01)

(52) U.S. Cl. ........................ 526/352; 526/348; 526/118; 526/124.3; 526/124.2; 526/123.1; 502/103; 502/115; 502/125; 502/127

(58) Field of Classification Search ................ 526/352, 526/348, 118, 124.3, 124.2, 123.1; 502/103, 502/115, 125, 127
See application file for complete search history.

(56) References Cited

U.S. PATENT DOCUMENTS

| | | | | |
|---|---|---|---|---|
| 4,298,718 A | | 11/1981 | Mayr et al. ................ 526/125 |
| 4,399,054 A | | 8/1983 | Ferraris et al. ......... 252/429 B |
| 4,469,648 A | | 9/1984 | Ferraris et al. ................ 264/9 |
| 4,495,338 A | | 1/1985 | Mayr et al. ................ 526/125 |
| 5,091,353 A | * | 2/1992 | Kioka et al. ................ 502/111 |
| 5,298,474 A | * | 3/1994 | Luciani et al. .............. 502/115 |
| 5,356,848 A | * | 10/1994 | Brusson et al. ............. 502/117 |
| 5,733,987 A | | 3/1998 | Covezzi et al. ............... 526/65 |
| 6,071,846 A | * | 6/2000 | Kitajima et al. ............ 502/125 |
| 6,306,985 B1 | * | 10/2001 | Xiao et al. .................. 526/158 |

FOREIGN PATENT DOCUMENTS

| | | |
|---|---|---|
| EP | 0395083 | 10/1990 |
| EP | 0522651 | 1/1993 |
| EP | 0553805 | 8/1993 |
| EP | 0553806 | 8/1993 |
| EP | 0564211 | 10/1993 |
| EP | 0601525 | 6/1994 |
| EP | 0739907 | 10/1996 |
| WO | 9221706 | 12/1992 |
| WO | 9303078 | 2/1993 |
| WO | 9844009 | 10/1998 |

* cited by examiner

*Primary Examiner*—Ling-Sui Choi

(57) ABSTRACT

A process for the (co)polymerization ethylene, optionally in mixtures with olefins CH=CHR in which R is hydrogen or a hydrocarbyl radical with 1–12 carbon atoms, carried out in the presence of a catalyst system comprising (A) a solid catalyst component which comprises Mg, halogen an electron donor selected form ethers, esters, or amines, and Ti atoms in an oxidation state such that the weight percentage ratio between $Ti^{(red)}/Ti_{(tot)}$ ranges from about 0.05 to about 1; wherein $Ti^{(red)}$ is the weight percentage on the solid catalyst component of the Ti atoms having a valence less than 4 and $Ti_{(tot)}$ is the weight percentage on the solid catalyst component of all the Ti atoms and (B) an Al-alkyl compound. The said process is capable to produce ethylene polymers with a reduced oligomers content and/or improved mechanical characteristics.

13 Claims, No Drawings

PROCESS FOR THE (CO)POLYMERIZATION OF ETHYLENE

This application is the U.S. national phase of International Application PCT/EP02/02803, filed Mar. 11, 2002.

The present invention relates to a process for the (co)polymerization ethylene, optionally in mixtures with olefins $CH_2$=CHR in which R is hydrogen or a hydrocarbyl radical with 1–12 carbon atoms, carried out in the presence of a specific Ziegler-Natta comprising Mg, halogen, an electron donor compound and Ti atoms in a different valence state. The said process, is capable to give ethylene copolymers with a reduced oligomers content and/or improved mechanical characteristics. In the polyolefin field Ziegler-Natta supported catalysts are customarily used for the preparation of homo or copolymers of olefins such as ethylene, propylene, butene-1 and so forth. These catalysts, and in particular those using Mg compounds as supports, allow to obtain good products in high yields and are sufficiently versatile to be used in several kinds of polymerization processes. Among the various homo and copolymers obtainable with the supported Z/N catalysts, copolymers of ethylene with one or more alpha-olefins having a molar content of units derived from ethylene of higher than 80%, and in particular Linear low-density polyethylene, (LLDPE) are the most important products. Due to their characteristics, they find application in many sectors and in particular in the field of wrapping and packaging of goods where, for example, the use of stretchable films based on LLDPE constitutes an application of significant commercial importance. In order to be used in the packaging field, one of the important requirements for the LLDPE films is the tear resistance which is measured by the Elmendorf test. Usually, the chemical and physical properties of the polymers are adjusted so as to give films showing a threshold acceptable value of Elmendorf. The common way to reach the requested Elmendorf value is that of lowering the density of the LLDPE by introducing a higher amount of alpha-olefin comonomer. However, as the Z/N supported catalysts have the tendency to give a broad compositional distribution, the result is that very often a too high fraction of highly modified soluble copolymers is obtained. This fraction is responsible for problems both in the carrying out of the polymerization process and in the properties of the final products because the low molecular weight soluble polymers have the tendency to migrate to the surface of the films (blooming) thereby making the film itself sticky. EP 739907 discloses a solid catalyst component comprising magnesium, titanium, halogen and an electron donor compound in which the divalent titanium atoms account for not more than 25 atomic % of the whole titanium atom content and trivalent titanium atoms account for at least 30 atomic % of the whole titanium atom content. According to the said document the catalyst obtained by this catalyst component is capable to form propylene polymers with high stereoregularity and good yields. In EP 739907 the catalyst system is never used for (co)polymerizing ethylene. It has now been found a novel polymerization process that is able to produce ethylene copolymers having, for a certain density, an increased Elmendorf value. This makes it possible to produce LLDPE at a requested Elmendorf, with a higher density and a consequently lower amount of soluble fraction. The process for the (co)polymerization of ethylene, optionally in mixtures with olefins $CH_2$=CHR in which R is hydrogen or a hydrocarbon radical with 1–12 carbon atoms, is carried out in the presence of a catalyst system comprising (A) a solid catalyst component which comprises Mg, halogen, an electron donor selected from ethers, esters, or amines, and Ti atoms in an oxidation state such that the weight percentage ratio between $Ti^{(red)}/Ti_{(tot)}$ ranges from about 0.05 to about 1; wherein $Ti^{(red)}$ is the weight percentage on the solid catalyst component of the Ti atoms having a valence less than 4 and $Ti_{(tot)}$ is the weight percentage on the solid catalyst component of all the Ti atoms, and (B) an Al-alkyl compound. In particular the ratio $Ti^{(red)}/Ti_{(tot)}$ preferably ranges from 0.1 to 0.9, more preferably from 0.2 to 0.85 and still more preferably from 0.4 to 0.8. It is especially preferred that the catalyst components possess the above mentioned features before being subject to conditions such that (pre)polymerization takes place. The electron donor compound is preferably selected from ethers and esters of organic mono or dicarboxylic acids. Among ethers, particularly preferred are the 1,3-diethers of the general formula (I):

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals.

As explained preferred esters are those of organic monocarboxylic or dicarboxylic acids. Said acids can be aliphatic or aromatic. Among esters of aliphatic acids, particularly preferred are the esters of dicarboxylic acids in particular esters of malonic, glutaric or succinic acids. Preferred esters of aromatic carboxylic acids are selected from $C_{1-C20}$ alkyl or aryl esters of benzoic and phthalic acids, possibly substituted. The alkyl esters of the said acids are preferred. Particularly preferred are the $C_{1-C6}$ linear or branched alkyl esters. Specific examples are ethylbenzoate, n-butylbenzoate, p-methoxy ethylbenzoate, p-ethoxy ethylbenzoate, isobutylbenzoate, ethyl p-toluate, diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate. The electron donor compound is normally present in amounts such as to give a $Ti_{(tot)}$/ED molar ratio of higher than 1, preferably higher than 2.5 and more preferably higher than 4. As explained above, the catalyst component (A) comprises, in addition to the above electron donors, Ti compounds in different valence state, Mg and halogen. In particular, the catalyst component comprises in addition to the above electron donors, titanium compounds having at least a Ti-halogen bond and a Mg dihalide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The preferred titanium compounds used in the catalyst component of the present invention are the halides of Ti, in particular among those in which the Ti has valence 4, $TiCl_4$, and among those in which the Ti has valence lower than 4 $TiCl_3$; furthermore, can also be used Ti-haloalcoholates of formula $Ti(OR^I)_{n-y}X_y$, where n is the valence of titanium, y is a number between 1 and n, X is halogen, preferably chlorine, and $R^I$ is a C1–C15 hydrocarbon group. As explained, the amount and kind of Ti compounds must be such that to have the ratio $Ti^{(red)}/Tt_{(tot)}$ ranging from about 0.05 to about 1.

The preparation of the solid catalyst component (A) can be carried out according to several methods. One of the preferred methods comprises the preparation of a solid comprising titanium compounds with a valence higher than 3, Mg compounds and electron donor and then the reaction of this solid with a compound capable to reduce at least partially the titanium compounds in order to form Ti compounds with different valence states meeting the above ratio requirement. The preparation of a solid catalyst component comprising titanium compounds with a valence higher than 3, Mg compounds and electron donor can be carried out according to several methods. According to one of these methods, the magnesium dichloride in an anhydrous state and the electron donor compound are milled together under conditions such that activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, the electron donor compound. The treatment with $TiCl_4$ is repeated and the solid is washed with hydrocarbon solvents in order to eliminate any non-reacted $TiCl_4$.

According to a preferred method, the solid catalyst component can be prepared by reacting a titanium compound of formula $Ti(OR^I)_{4-y}X_y$, preferably $TiCl_4$, where y is a number between 1 and 4, and X and $R^I$ have the meaning previously explained, with a magnesium chloride deriving from an adduct of formula $MgCl_2 \bullet pR^{II}OH$, where p is a number between 0,1 and 6, preferably from 2 to 3.5, and $R^{II}$ is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0,1 and 2,5. The reaction with the Ti compound can be carried out by suspending the adduct (dealcoholated or as such) in cold $TiCl_4$ (generally 0° C.); the mixture is heated up to 80–130° C. and kept at this temperature for 0,5–2 hours. The treatment with $TiCl_4$ can be carried out one or more times. The electron donor compound can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44009. The solid catalyst components obtained according to the above method show a surface area (by B.E.T. method) generally between 20 and 500 m²/g and preferably between 50 and 400 m²/g, and a total porosity (by B.E.T. method) higher than 0,2 cm³/g preferably between 0,2 and 0,6 cm³/g. The porosity (Hg method) due to pores with radius up to 10.000 Å generally ranges from 0.3 to 1.5 cm³/g, preferably from 0.45 to 1 cm³/g. In any of these preparation methods the desired electron donor compound can be added as such or, in an alternative way, it can be obtained in situ by using an appropriate precursor capable to be transformed in the desired electron donor compound by means, for example, of known chemical reactions such as esterification, transesterification etc.

As explained above the so obtained solid is then reacted with a compound having a reducing ability with respect to the titanium atoms with a valence of 4. This compound may be any compound that, on the basis of its red/ox characteristics, one skilled in the art can expect to be effective. Examples of such compounds are organometallic compounds such as organoaluminum compounds or polyhydrosiloxanes. Particularly preferred are organoaluminum compounds of formula $AlR^{III}_aX_{3-a}$ where a is from 1 to 3, $R^{III}$ is a C1–C15 hydrocarbon group, X is halogen. Preferably, a is 3 and R is a C1–C10 alkyl group.

The contact of the reducing compound with the solid disclosed above must occur under conditions such that the reducing compound is effective in giving the ratio $Ti_{(red)}/Ti_{(tot)}$ ranging from about 0.05 to about 1. This means that conditions such reaction time, temperature and concentration of reactants must be suitably selected to get the required properties. For example, working with very diluted systems or too short reaction times or in the presence of compounds that lower the reducing abilities of the reducing compound may not be suitable for obtaining the required product. The contact preferably occurs in the presence of a liquid medium that can be selected from liquid organic substances. Preferably it is selected from liquid aliphatic or aromatic hydrocarbons, optionally halogenated, such as pentane, hexane, dichloromethane, benzene, toluene etc. It has been found convenient to work with these systems with a concentration of solid ranging from 1 to 300 g/l, while the reducing compound concentrations can be lower or higher depending on the reducing capabilities. Generally, reaction times of from 1 minute to several hours are used. Such times however, can sometimes be shorter or longer depending also on the reducing capabilities and on the concentration of the reactants.

The contact may be carried out one or more times. At the end of the treatment with the reducing agent the solid catalyst component obtained can be washed with inert solvents and then dried.

The solid catalyst component (B) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides such as $AlEt_2Cl$ and $Al_2Et_3Cl_3$.

Optionally the catalyst system used in the process of the invention can also comprise one or more electron-donor compounds (external donor) as component (C).

The external donor (C) can be of the same type or it can be different from the electron donor compound present in the solid catalyst component (A). Suitable external electron-donor compounds include silicon compounds, ethers, esters such as ethyl 4-ethoxybenzoate, amines, heterocyclic compounds and particularly 2,2,6,6-tetramethyl piperidine, and ketones. One particular class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-metil-dimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane. The electron donor compound (C) is used in such an amount to give a molar ratio between the organoaluminum compound and said electron donor compound (c) of from 0.1 to 500, preferably from 1 to 300 and more preferably from 3 to 100. As previously indicated, the said process is suitable for preparing a broad range of ethylene polymers. In particular, linear low density polyethylenes (HDPE, having a density lower than 0.940 $g/cm^3$) and very-low-density and ultra-low-density polyethylenes (VLDPE and ULDPE, having a density lower than 0.920 $g/cm^3$, to 0.880 $g/cm^3$) consisting of copolymers of ethylene with one or more alpha-olefins having from 3 to 12 carbon atoms, having a mole content of units derived from ethylene of higher than 80% can be prepared. Preferably, the alpha-olefins are selected from propylene, butene-1,4-methyl-1-pentene, hexene-1, octene-1. As mentioned above, the polymerization of ethylene in mixture with butene, hexene-1 or octene-1 is especially preferred. However, the said process is also suitable for the preparation of, for example, high density ethylene polymers (HDPE, having a density higher than 0.940 $g/cm^3$), comprising ethylene homopolymers and copolymers of ethylene with alpha-olefins having 3–12 carbon atoms; elastomeric copolymers of ethylene and propylene and elastomeric terpolymers of ethylene and propylene with smaller proportions of a diene having a content by weight of units derived from ethylene of between about 30 and 70%. The LLDPE prepared with the process of the invention has so improved mechanical properties that the use of a polymer with a lower density is no longer required and, as a consequence, also the presence of high content of soluble fraction is avoided. As demonstrated by the working examples reported below, film meeting the requested mechanical properties have been produced by using ethylene copolymers obtained with process of the invention and having higher density and lower soluble fraction content with respect to the polymers of the prior art. The working examples also show that the LLDPE polymers prepared with the process of the invention and having the same density values and soluble fraction content as those of the prior art, have improved mechanical properties. It has in particular been found that the copolymers of ethylene with one or more alpha-olefins having from 3 to 12 carbon atoms, having a mole content of units derived from ethylene of higher than 80% produced with the process of the invention are characterized by a ratio between the intrinsic viscosity of the soluble fraction and the intrinsic viscosity of the whole polymer higher than 0.8. The polymerization process of the invention can be carried out according to known techniques either in liquid or gas phase using, for example, the known technique of the fluidized bed or under conditions wherein the polymer is mechanically stirred. The catalyst can be used as such in the polymerization process by introducing it directly into the reactor. However, it constitutes a preferential embodiment the pre-polymerization of the catalyst with an olefin. In particular, it is especially preferred pre-polymerizing ethylene, or propylene or mixtures thereof with one or more α-olefins, said mixtures containing up to 20% by mole of α-olefin, forming amounts of polymer from about 0.1 g per gram of solid component up to about 1000 g per gram of solid catalyst component. The pre-polymerization step can be carried out at temperatures from 0 to 80° C. preferably from 5 to 50° C. in liquid or gas-phase. The pre-polymerization step can be performed in-line as a part of a continues polymerization process or separately in a batch process. The batch pre-polymerization of the catalyst of the invention with ethylene in order to produce an amount of polymer ranging from 0.5 to 20 g per gram of catalyst component is particularly preferred. The main polymerization process of the invention can be carried out according to known techniques either in liquid or gas phase using for example the known technique of the fluidized bed or under conditions wherein the polymer is mechanically stirred. Preferably the process is carried out in the gas phase. Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised.

Therefore, in the case that the polymerization takes place in gas-phase, the process of the invention is suitably carried out according to the following steps:

(a) contact of the catalyst components in the absence of polymerizable olefin or optionally in the presence of said olefin in amounts not greater than 20 g per gram of the solid component (A);

(b) pre-polymerization of ethylene or mixtures thereof with one or more α-olefins, said mixtures containing up to 20% by mole of α-olefin, forming amounts of polymer from about 0.1 g per gram of solid component (A) up to about 1000 g per gram;

(c) gas-phase polymerization of one or more olefins $CH_2=CHR$, in which R is hydrogen or a hydrocarbon radical having 1–10 carbon atoms, in one or more fluidized or mechanically stirred bed reactors using the pre-polymer-catalyst system coming from (b).

As mentioned above, the pre-polymerization step can be carried out separately in batch. In this case, the pre-polymerized catalyst is pre-contacted according to step (a) with the aluminum alkyl and then directly sent to the gas-phase polymerization step (c).

The Molecular Weight of the polymer is normally controlled using hydrogen or other agents capable to regulate the Molecular Weight. If needed the polymerization process of the invention can be performed in two or more reactors working under different conditions and optionally by recycling, at least partially, the polymer which is formed in the second reactor to the first reactor. As an example the two or more reactors can work with different concentrations of molecular weight regulator or at different polymerization temperatures or both. The following examples are given in order to further describe the present invention in a non-limiting manner.

Characterization

The properties are determined according to the following methods:

Melt Index: measured at 190° C. according to ASTM D-1238 condition "E" (load of 2.16 Kg) and "F" (load of 21.6 Kg);

Comonomer content

1-Butene was determined via Infrared Spectrometry.

Effective density: ASTM-D 1505

Intrinsic viscosity [η]: measured in tetraline at 135° C.

Determination of $Ti^{(red)}$ 0.5 g of the sample in powder form, are dissolved in 100 ml of HCl 2.7M in the presence of solid $CO_2$. The so obtained solution is then subject to a volumetric titration with a solution of $FeNH_4(SO_4)_2 \cdot 12H_2O$ 0.1N, in the presence of solid $CO_2$, using as indicator of the equivalence point $NH_4SCN$ (25% water solution). The stoichiometric calculations based on the volume of the titration agent consumed give the weight amount of $Ti^{3+}$ in the sample.

Determination of $Ti_{(tot)}$.

1 g of the sample in powder form is poured in a 500 ml-glass flask, containing 100 ml of $H_2SO_4$ 1.8M. The system is left to stay for about 1 hour, while stirring to increase the dissolution of the sample. After that, the whole is poured in a known volume flask and brought to exact volume with water. 100 ml of the solution obtained above are poured in a glass flask containing 50 g of metallic Zn and 50 ml of HCl in order to convert all the Ti atoms at an oxidation state lower than 4. After about 1 hour the solution was filtered in a glass flask containing solid $CO_2$. It was obtained a clear solution which was titrated according to the same procedure as that illustrated for the determination of the $Ti^{(red)}$.

EXAMPLES

Example 1

Preparation of the Spherical Support ($MgCl_2$/EtOH Adduct)

The adduct of magnesium chloride and alcohol was prepared according to the method described in Example 2 of U.S. Pat. No. 4,399,054, but operating at 2000 rpm instead of 10,000 rpm.

The adduct containing approximately 3 mol of alcohol had an average size of approximately 60 μm, with a dispersion range of approximately 30–90 μm.

Preparation of the Solid Component

The spherical support, prepared according to the general method, was subjected to thermal treatment, under nitrogen flow, within the temperature range of 50–150° C., until spherical particles having a residual alcohol content of about 35 wt. % (1.1 mol of alcohol per mole of $MgCl_2$) were obtained. 16 g of this support were charged, under stirring at 0° C., to a 750 cm³ reactor containing 320 cm³ of pure $TiCl_4$ and 3.1 cm³ of diisobutylphtalate, were slowly added and the temperature was raised to 100° C. in 90 minutes and kept constant for 120 minutes. Stirring was discontinued, settling was allowed to occur and the liquid phase was removed at the temperature of 80° C. Further 320 cm³ of freshly $TiCl_4$ were added and the temperature was raised to 120° C. and kept constant for 60 minutes. After 10 minutes settling the liquid phase was removed at the temperature of 100° C. The residue was washed with anhydrous heptane (300 cm³ at 70° C. then 3 times (250 cm³ each time) with anhydrous hexane at 60° C. and further 4 at ambient temperature. The component in spherical form was vacuum dried at 50° C.

The characteristics of the solid (a) were the following:

| | |
|---|---|
| $Ti_{(tot)}$ | 2.3 wt. % |
| $Ti^{(red)}$ | not present |
| Mg | 19.8 wt. % |
| diisobutylphtalate | 4.2 wt. % |

The so obtained solid (a) is then introduced in a 5 l glass reactor containing a volume of hexane such as to have a concentration of 55 g/l. An amount of triethylaluminum such as to give a weight ratio TEAL/catalyst of 0.25. The temperature of the system was brought to 30° C. and kept under stirring at this temperature for 30 minutes. After that the liquid phase was siphoned off and the same treatment with TEAL repeated a second time. After having washed the solid with hexane and dried it under vacuum the analysis showed the following composition:

| | |
|---|---|
| $Ti_{(tot)}$ | 2.1 wt. % |
| $Ti^{(red)}$ | 1.54 |
| Mg | 21.1 wt. % |
| diisobutylphtalate | 1.6 wt. % |

Polymerization

The polymerization process was carried out in a plant working continuously and equipped with a reactor in which the catalyst components are mixed to form the catalyst, two loop reactors receiving the catalyst formed in the previous step and fed with liquid propylene and propane, and one fluidized bed reactor, receiving the pre-polymer formed in the loop reactors. The solid catalyst component prepared as described above, a solution of triethyl aluminium (TEAL) in n-exane and methyl-cycloexyl-dimethoxysilane as electron-donor in such an amount that the TEAL/silane weight ratio is 4.5 and the TEAL/Catalyst weight ratio is 5.0, were fed into the pre-contact reactor which was kept at the temperature of 10° C. In the same reactor propane was also fed as inert medium. The residence time was about 9 minutes. The product discharged from the reactor was then fed into the first loop pre-polymerization reactor kept at 20° C. The residence time in the loop reactor was about 32 minutes. After that time the pre-polymer was transferred to the second loop reactor kept at 50° C. and further polymerization went on for an average residence time of 80 minutes. After that time the product was discharged from the loop reactor and transferred to the fluidized bed reactor which was maintained at a temperature of 75° C. with a reaction pressure of 24 bar. The average residence time of the polymer forming inside the reactor was about 244 minutes. The components fed to the fluidized bed reactor were the following:

ethylene and 1-butene as polymerization monomers;
hydrogen as molecular weight regulator;
propane as inert medium.

The detailed list of working conditions for each step of the process is reported below:

Pre-contact Step
  temperature (° C.)=10
  residence time (min.)=9
  Catalyst feeding (g/h) 10
  Teal feeding (g/h)=50
  Donor feeding (g/h)=11
  propane feeding (Kg/h)=5

First Pre-polymerization Step
  temperature (° C.)=20
  residence time (min.)=32
  propane feeding (Kg/h)=50
  propylene feeding (Kg/h)=3.5

Second Pre-polymerization Step
  temperature (° C)=50
  residence time (min.)=80
  propane feeding (Kg/h)=20

Gas Phase Reactor
  temperature (° C.)=75
  pressure (bar)=24
  residence time (min)=244
  ethylene (% mol)=20.9
  butene-1 (% mol)=9
  hydrogen (% mol)=6.8
  propane (% mol)=63.2

The polymer obtained was continuously discharged into the steaming and drying section of the plant and subsequently characterized. The polymer obtained showed a density of 0.916, a comonomer content of 8% wt and xylene soluble fraction of 14.1% having an intrinsic viscosity of 1.59. The intrinsic viscosity of the whole polymer was 1.78.

With the ethylene copolymer prepared according to the polymerization process disclosed above it was produced a blown film having a thickness of 25 μm with the properties reported in Table 1.

Example 2

Polymerization

The polymerization of ethylene and butene-1 was carried out with the same catalyst and apparatus used in example 1 under the following conditions:

The solid catalyst component prepared as described above, a solution of triethyl aluminum (TEAL) in n-exane and methyl-cycloexyl dimethoxysilane as electron-donor in such an amount that the TEAL/silane weight ratio is 4.2 and the TEAL/Catalyst weight ratio is 5.2 were fed into the pre-contact reactor which was kept at the temperature of 10° C. In the same reactor propane was also fed as inert medium. The residence time was about 9 minutes.

The product discharged from the reactor was then fed into the first loop pre-polymerization reactor kept at 20° C. The residence time in the loop reactor was about 32 minutes. After that time the pre-polymer was transferred to the second loop reactor kept at 50° C. and further polymerization went on for an average residence time of 80 minutes. After that time the product was discharged from the loop reactor and transferred to the fluidized bed reactor which was maintained at a temperature of 75° C. with a reaction pressure of 24 bar. The average residence time of the polymer forming inside the reactor was about 250 minutes. The components fed to the fluidized bed reactor were the following:

ethylene and 1-butene as polymerization monomers;
hydrogen as molecular weight regulator;
propane as inert medium.

The detailed list of working conditions for each step of the process is reported below:

Pre-contact Step
  temperature (° C.)=10
  residence time (min.)=9
  Catalyst feeding (g/h)=10
  Teal feeding (g/h)=52
  Donor feeding (g/h)=12.5
  propane feeding (Kg/h)=5

First Pre-polymerization Step
  temperature (° C.)=20
  residence time (min.)=32
  propane feeding (Kg/h)=50
  propylene feeding (Kg/h)=3.5

Second Pre-polymerization Step
  temperature (° C.)=50
  residence time (min.)=80
  propane feeding (Kg/h)=20

Gas Phase Reactor
  temperature (° C.)=75
  pressure (bar)=24
  residence time (min)=250
  ethylene (% mol)=20.5
  butene-1 (% mol)=7.7
  hydrogen (% mol)=6.8
  propane (% mol)=65

The polymer obtained was continuously discharged into the steaming and drying section of the plant and subsequently characterized.

The polymer obtained showed a density of 0.919, a comonomer content of 7.1% wt and xylene soluble fraction of 11.6% having an intrinsic viscosity of 1.5. The intrinsic viscosity of the whole polymer was 1.78. With the ethylene copolymer prepared according to the polymerization process disclosed above it was produced a blown film having a thickness of 25 μm with the properties reported in Table 1.

Comparison Example 1

A polymerization of ethylene was carried out using the same apparatus and conditions described in example 1 with the only difference that as a solid catalyst component was used the solid (a) of example 1 in which the ratio $Ti^{(red)}/Ti_{(tot)}$ is 0. The polymer obtained showed a density of 0.917, a comonomer content of 8% wt and xylene soluble fraction of 14.5% having an intrinsic viscosity of 1.4. The intrinsic viscosity of the whole polymer was 1.82.

With the ethylene copolymer prepared according to the polymerization process disclosed above it was produced a blown film having a thickness of 25 μm with the properties reported in Table 1.

TABLE 1

|  | EX. 1 | EX. 2 | COMP. EX. 1 |
| --- | --- | --- | --- |
| Haze | 40 | 43 | 35 |
| Gloss | 14 | 13 | 15 |
| Dart-test | 117 | 110 | 95 |
| Elmendorf TD/MD | 435/230 | 420/180 | 425/180 |

What is claimed is:

1. A process comprising polymerizing ethylene, optionally in mixtures with olefins $CH_2$=CHR in which R is a hydrocarbon radical with 1–12 carbon atoms, carried out in the presence of a catalyst system comprising (A) a solid catalyst component which comprises Mg, halogen, an electron donor selected from ethers, esters, or amines, and Ti atoms in an oxidation state such that the weight percentage ratio between $Ti^{(red)}/Ti_{(tot)}$ ranges from about 0.05 to about 1 wherein $Ti^{(red)}$ is the weight percentage on the solid catalyst component of the Ti atoms having a valence less than 4 and $Ti_{(tot)}$ is the weight percentage on the solid catalyst component of all the Ti atoms, and (B) an Al-alkyl compound; wherein a molar ratio of $Ti_{(tot)}$/electron donor is higher than 1.

2. A process according to claim 1 in which in the solid catalyst component (A) the ratio $Ti^{(red)}/Ti_{(tot)}$ ranges from 0.1 to 0.9.

3. A processs according to claim 2 in which the ratio $Ti^{(red)}/Ti_{(tot)}$ ranges from 0.2 to 0.85.

4. A process according to claim 1 in which in the solid catalyst component (A) the electron donor compound is selected from ethers and esters of organic mono or dicarboxylic acids.

5. A process according to claim 4 in which the electron donor compound is selected from alkyl esters of phthalic acids.

6. A process according to claim 4 in which the electron donor compound is selected from 1,3-diethers of the general formula (I):

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle.

7. The process according to claim 1 in which the solid catalyst component (A) comprises an electron donor, titanium compounds having at least a Ti-halogen bond and a Mg dihalide.

8. The process according to claim 7 in which the titanium compounds are the chlorides of Ti.

9. The process according to claim 1 in which the catalyst component (B) is a trialkyl aluminum compound.

10. The process according to claim 9 in which the trialkylaluminum compound is selected from triethylaluminum, triisobutylaluminum, tri-n-butylaluminum, tri-n-hexylaluminum and tri-n-octylaluminum.

11. The process according to claim 1 in which the olefins $CH_2$=CHR, are selected from propylene, butene-1, 4-methyl-1-pentene, hexene-1, and octene-1.

12. The process according to claim 1 in which the catalyst system further comprises one or more external electron-donor compounds (C).

13. The process according to claim 12 in which the electron donor compound (C) is a silicon compound of formula $R_a^5 R_b^6 Si(OR^7)_c$, where a and b are integers from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms.

* * * * *